(12) United States Patent
Noma (10) Patent No.: US 8,099,143 B2
(45) Date of Patent: Jan. 17, 2012

(54) CELLULAR PHONE CAPABLE OF BEING BIAXIAL PIVOTAL

(75) Inventor: Satoru Noma, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 606 days.

(21) Appl. No.: 12/186,799

(22) Filed: Aug. 6, 2008

(65) Prior Publication Data

US 2009/0088228 A1 Apr. 2, 2009

(30) Foreign Application Priority Data

Sep. 28, 2007 (JP) ................. P2007-254978

(51) Int. Cl.
*H04M 1/00* (2006.01)
*H04B 1/38* (2006.01)
(52) U.S. Cl. ............. 455/575.3; 455/575.1; 455/90.3
(58) Field of Classification Search .......... 455/575.3, 455/575.1, 90.3, 569.1
See application file for complete search history.

(56) References Cited

U.S. PATENT DOCUMENTS

| | | | |
|---|---|---|---|
| 7,215,981 B2* | 5/2007 | Yang | 455/575.3 |
| 7,277,086 B2* | 10/2007 | Sugihara | 345/169 |
| 7,353,050 B2* | 4/2008 | Im et al. | 455/575.3 |
| 7,443,404 B2* | 10/2008 | Kawamoto et al. | 345/660 |
| 7,599,720 B2* | 10/2009 | Fujihara et al. | 455/575.1 |
| 7,646,417 B2* | 1/2010 | Goto et al. | 348/333.06 |
| 7,697,964 B2* | 4/2010 | Hwang | 455/575.3 |
| 2005/0054396 A1* | 3/2005 | Yang | 455/575.3 |
| 2005/0245294 A1* | 11/2005 | Gupte et al. | 455/575.1 |
| 2006/0148540 A1* | 7/2006 | Satoh et al. | 455/575.3 |
| 2006/0211457 A1* | 9/2006 | Otsuka | 455/575.1 |
| 2007/0054636 A1* | 3/2007 | Ahn et al. | 455/128 |
| 2007/0123324 A1* | 5/2007 | Sato et al. | 455/575.3 |
| 2009/0149226 A1* | 6/2009 | Watanabe | 455/575.3 |

FOREIGN PATENT DOCUMENTS

JP 2006-005863 A 1/2006
WO WO 2006/068122 A1 6/2006

OTHER PUBLICATIONS

Japanese Office Action dated Apr. 21, 2009 (3 pages), issued in counterpart Japanese Application Serial No. 2007-254978.

\* cited by examiner

*Primary Examiner* — Brandon Miller
(74) *Attorney, Agent, or Firm* — Maschoff Gilmore & Israelsen (57) ABSTRACT

An information processing apparatus includes an opening/closing mechanism in which a first casing and a second casing are hinge-connected via a hinge unit and the first casing and the second casing perform opening and closing operations via the hinge unit and a rotation mechanism in which the second casing is rotated about a twisting central axis which protrudes and contacts the hinge unit and rotatably supports the second casing, in which in a closed state where one face of the first casing and one face of the second casing are overlapped one another, a clearance between the casings is set to have a first distance, and in another closed state where the other face of the first casing and the other face of the second casing are overlapped one another, the clearance between the casings is set to have a second distance different from the first distance.

5 Claims, 5 Drawing Sheets

CELLULAR PHONE CAPABLE OF BEING BIAXIAL PIVOTAL

BACKGROUND OF THE INVENTION

1. Field of the Invention

The present invention relates to an information processing apparatus. In particular, the invention relates to an information processing apparatus such as a cellular phone capable of being biaxial pivotal.

2. Description of the Related Art

In recent years, cellular phones in various styles have been proposed. For example, a slide style cellular phone, a straight style cellular phone, a flip style cellular phone, a foldable cellular phone, and the like have been proposed. In particular, the foldable cellular phone has a lower casing (first casing) as a main body including operation keys and an upper casing (second casing different from the first casing) to which a main display is mounted. The lower casing and the upper casing are connected via an opening/closing mechanism including a hinge unit so as to be opened and closed. Among the foldable cellular phones is a foldable cellular phone capable of being biaxial pivotal such that the upper casing is rotated at about 180 degrees about a twisting central axis (for example, refer to Japanese Unexamined Patent Application Publication No. 2006-5863).

In the case of the cellular phone capable of being biaxial pivotal, in order to downsize the casings of the cellular phone in either state where the upper casing and the lower casing are closed so that the upper casing having the main display is on top of the lower casing or where the upper casing and the lower casings are closed after the upper casing is rotated at about 180 degrees about the twisting central axis, a central axis of a face of the upper casing is coincident with the twisting central axis used for rotating the upper casing.

At this time, in either state of the cellular phone described above, in order to keep a clearance between the upper casing and the lower casing constant, it is necessary to manage fluctuations in thickness of the casings in advance. To be more specific, fluctuations in thickness of the casings are generated respectively on a main display side and on a back face side of the upper casing in a manufacturing procedure of parts and at the time of assembly, so that the casings cannot be appropriately closed in some cases as the casing is swollen too much in the thickness direction in either state. For example, such a case is considerable that the upper casing becomes thicker to some extent in the manufacturing procedure and the upper casing contacts the lower casing so that the casings cannot be appropriately closed. In view of the above, it is necessary to manage fluctuations in thickness of the casings in advance, but in either state of the cellular phone described above, in order to keep a clearance between the upper casing and the lower casing constant, it is necessary to spare a slightly large clearance between the upper casing and the lower casing.

However, if the wasteful clearance exists between the upper casing and the lower casing, the casing size of the cellular phone becomes large, and there is a limitation in downsizing the casing of the cellular phone.

SUMMARY OF THE INVENTION

The present invention to provide has been made in view of the above-mentioned situation, and it is an object of the invention to provide an information processing apparatus such as a cellular phone in which a casing of a cellular phone can be appropriately downsized in accordance with a state of a cellular phone capable of being biaxial pivotal.

In order to solve the above-mentioned problem, according to an aspect of the present invention, there is provided an information processing apparatus, including: an opening/closing mechanism in which a first casing and a second casing are hinge-connected via a hinge unit and the first casing and the second casing are opened and closed via the hinge unit; and a rotation mechanism in which the second casing is rotated about a twisting central axis which protrudes and contacts the hinge unit to rotatably support the second casing, in which in a closed state where one face of the first casing and one face of the second casing are overlapped one another, a clearance between the first casing and the second casing is set to have a first distance, and in another closed state where the one face of the first casing and the other lace of the second casing are overlapped one another, the clearance between the first casing and the second casing is set to have a second distance which is different from the first, distance.

According to the aspect of the present invention, in accordance with the state of the cellular phone having the biaxial rotation system, the casing size of the cellular phone can be appropriately set compact.

DESCRIPTION OF THE PREFERRED EMBODIMENTS

Hereinafter, embodiments of the present invention will be described with reference to the drawings.

Figure 1A:
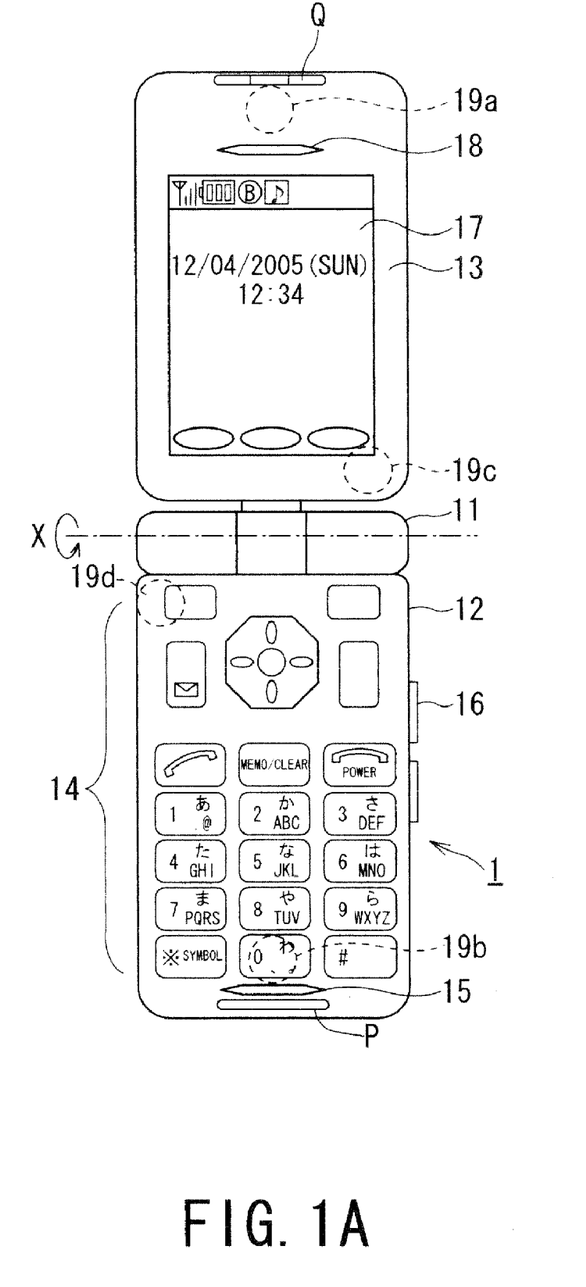
FIGS. 1A and 1B illustrate external configurations of a cellular phone opened at about 180 degrees as viewed from the front and the side which can be applied to an information processing apparatus according to an embodiment of the present invention.
Figure 1B:
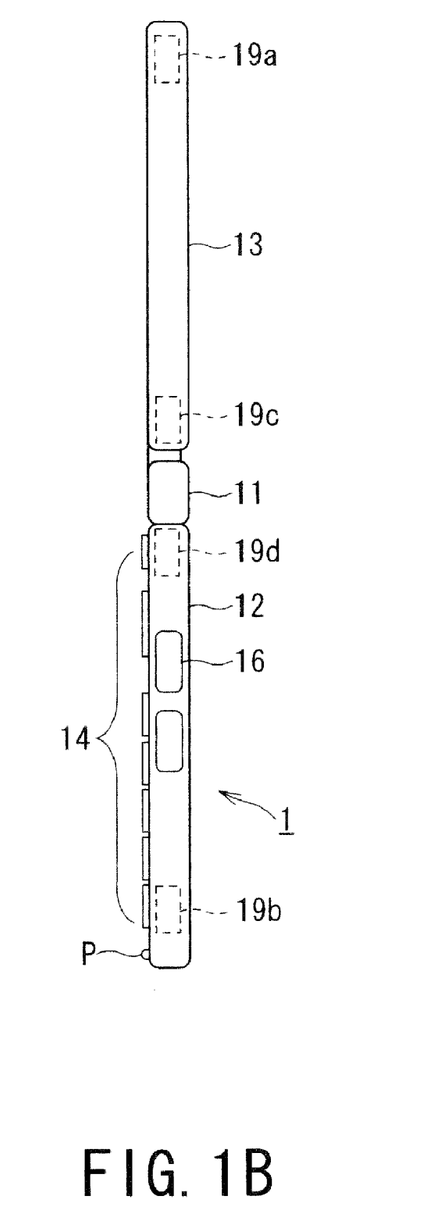

FIGS. 1A and 1B illustrate external configurations of a cellular phone 1 which can be applied to an information processing apparatus according to an embodiment of the present invention. It should be noted that FIG. 1A illustrates an external configuration of the cellular phone 1 opened at about 180 degrees as viewed from the front, and FIG. 1B illustrates an external configuration of the cellular phone 1 opened as viewed from the side. Also, the state of the cellular phone 1 opened at about 180 degrees (so-called open style) as referred to as "first state".

As illustrated in FIGS. 1A and 1B, the cellular phone 1 includes a first casing 12 and a second casing 13 which are hinge-connected with a hinge unit 11 at the center, and is formed so as to be foldable in an arrow X direction via the hinge unit 11. At a predetermined location inside the cellular phone 1, an antenna for transmission and reception is provided. The cellular phone 1 is adapted to transmit and receive radio waves with a base station (not shown) via the built-in antenna.

The first casing 12 is provided with operation keys 14 on its surface, such as alphanumeral keys from "0" to "9", an outgoing call key, a redial key, a power key, a clear key, and an electronic mail key. With use of the operation keys 14, it is possible to input various instructions.

The first casing 12 is provided with an arrow key and a confirmation key as the operation keys 14 in an upper part. As a user operates the arrow key in up, down, left, and right directions, an allocated cursor can be moved in the up, down, left, and right directions. To be more specific, various operations are executed such as a scroll operation of a telephone directory list and an electronic mail displayed on a main display 17 of the second casing 13, a page turning over operation of a simplified home page, and an image feed operation.

In addition, by pressing the confirmation key, various functions can be confirmed. For example, in the first casing 12, in accordance with the operation of the arrow key by the user, a desired telephone number is selected from a plurality of telephone numbers in the telephone directory list displayed on the main display 17 (liquid crystal display). When the confirmation key is pressed in an inside direction of the first casing 12, the selected telephone number is confirmed and an outgoing call processing is performed with respect to the telephone number.

Furthermore, the first casing 12 is provided with the electronic mail key on the left of the arrow key and the confirmation key. When the electronic mail key is pressed in the inside direction of the first casing 12, it is possible to call mail transmission and reception functions. A browser key is provided on the right of the arrow key and the confirmation key. When the browser key is pressed in the inside direction of the first casing 12, it is possible to view data of a Web page.

In addition, the first casing 12 is provided with a microphone 15 at a lower part of the operation keys 14. With the microphone 15, speech from the user at the time of conversation is collected. Also, the first casing 12 is provided with a side key 16 with which operations of the cellular phone 1 are performed.

It should be noted that a battery pack which is not shown is inserted to be attached on a back surface side of the first casing 12. When the call termination and power key is turned ON, electric power is supplied to the respective circuit units from the battery pack to activate the units in an operable state.

On the other hand, the second casing 13 is provided with the main display 17 on its front. In addition to the reception state of the radion waves, the battery remaining amount, other party names and telephone numbers registered as the call register, the transmission history, and the like, the main display 17 can display the contents of the electronic mail, the simplified home page, an image captured by a CCD (Charge Coupled Device) camera (a CCD camera 20 in FIGS. 2A and 2B which will be described later), a content received from an external content server (not shown), and a content stored in a memory card. In addition, a speaker 18 is provided at a predetermined upper position of the main display 17. With this configuration, the user can perform the speech conversation.

Also, magnetic sensors 19a, 19b, 19c, and 19d for detecting the state of the cellular phone 1 are provided at predetermined positions inside the first casing 12 and the second casing 13. Furthermore, at a predetermined position of the first casing 12 (for example, at a position on a base side of the microphone 15, etc.), a clearance keeper (contact member) P for keeping the clearance between the casings when the first easing 12 and the second casing 13 are closed is provided. In addition, at a predetermined position of the second casing 13 (for example, at a position on an end side of the speaker 18), a retreating recessed unit Q is provided which faces and contacts the clearance keeper P when the first casing 12 and the second casing 13 are closed. It should be noted that a technology related to the clearance keeper P and the retreating recessed unit Q is disclosed in Japanese Patent Application No. 2006-134347 filed by the same applicant as the present invention.

Figure 2A:
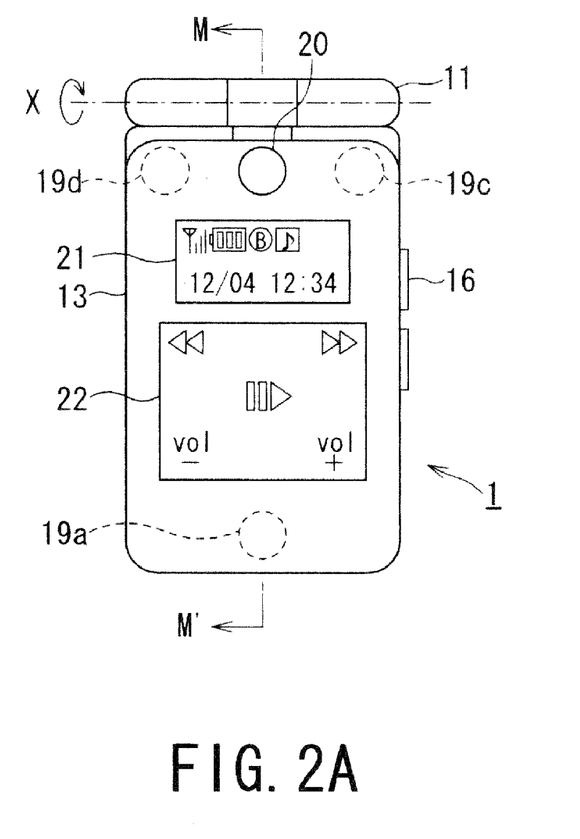
FIGS. 2A and 2B illustrate external configurations of the cellular phone closed as viewed from the front and the side which can be applied to the information processing apparatus according to the embodiment of the present invention.
Figure 2B:
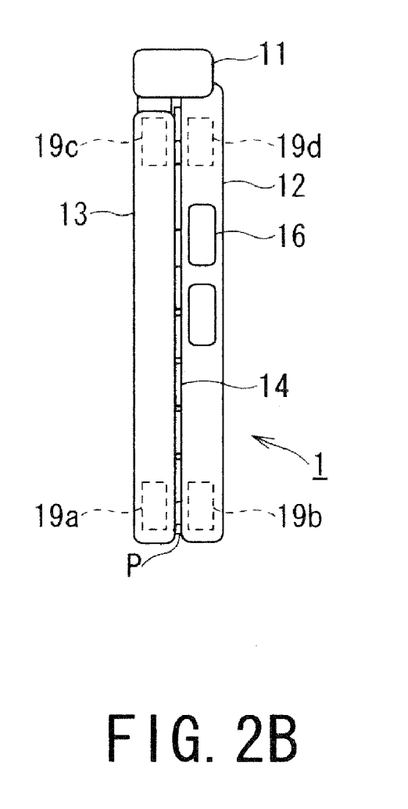

FIGS. 2A and 2B illustrate other external configurations of the cellular phone 1 which can be applied to the information processing apparatus according to the embodiment of the present invention. A state of the cellular phone 1 in FIGS. 2A and 2B refers to a state in which the cellular phone 1 is turned from the state in FIGS. 1A and 1B in an arrow X direction. It should be noted that FIG. 2A illustrates an external configuration of the cellular phone 1 closed as viewed from the front the front, and FIG. 2B illustrates an external configuration of the cellular phone 1 closed as viewed from the side. Also, the state of the cellular phone 1 illustrated in FIGS. 2A and 2B is referred to as "second state".

At an upper part of the second casing 13, the CCD camera 20 is provided. With the CCD camera 20, it is possible to capture an image of a desired photography target. At a lower part of the CCD camera 20, a sub display 21 is provided, where an antenna pictogram indicating the current antenna sensitivity, a battery pictogram indicating the current battery remaining amount of the cellular phone 1, the current time, and the like are displayed.

At a lower part of the sub display 21, an electrostatic touch pad 22 is furthermore provided. The electrostatic touch pad 22 is apparently composed of one sheet of a touch pad, but sensors which are not shown are provided at a plurality of positions. When the user touches a position in the vicinity of the sensor, the sensor detects the touching, and a rewinding function, a fast forward function, an audio volume down operation, an audio volume up operation, a reproduction operation, a pause operation, and the like are executed.

Figure 3A:
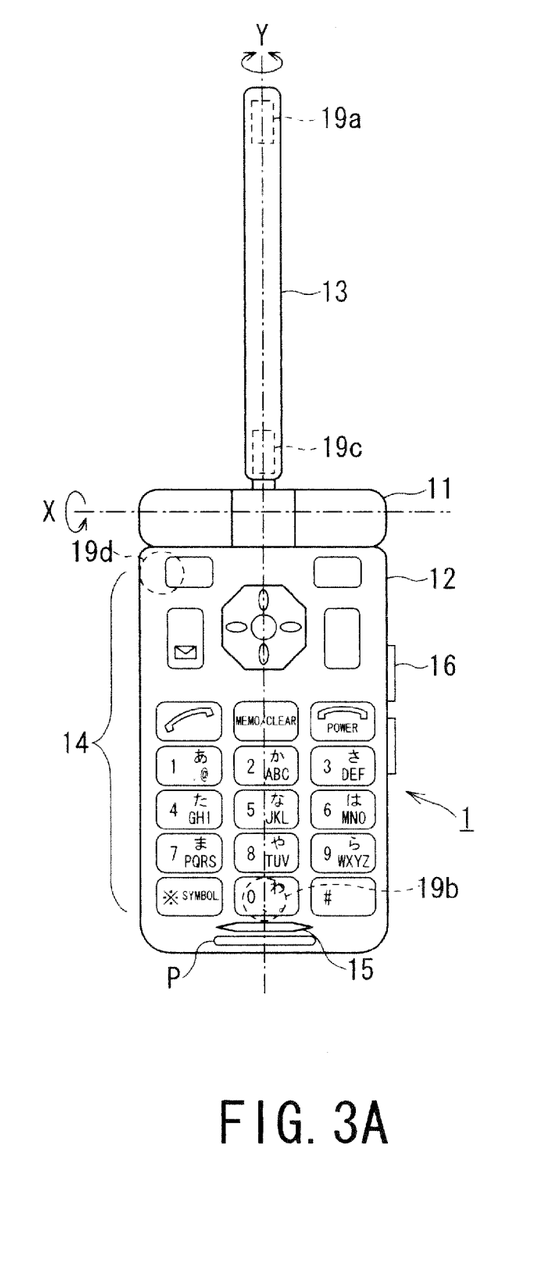
FIGS. 3A and 3B illustrate other external configurations of the cellular phone which can be applied to the information processing apparatus according to the embodiment of the present invention.
Figure 3B:
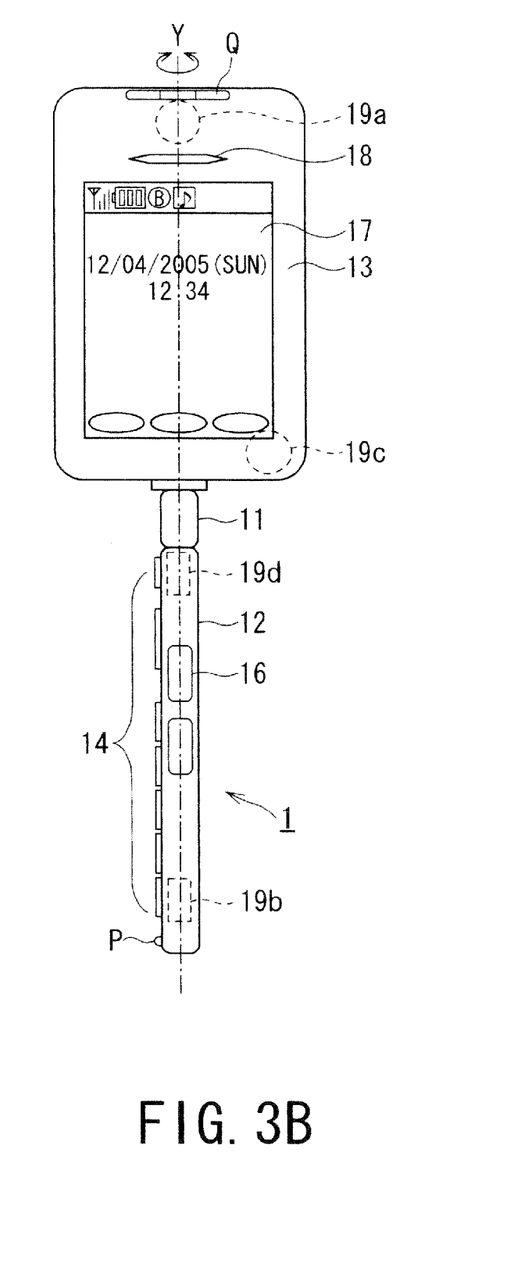

FIGS. 3A and 3B illustrate other external configurations of the cellular phone 1 which can be applied to the information processing apparatus according to the embodiment of the present invention. The state of the cellular phone 1 illustrated in FIGS. 3A and 3B is a state in which the cellular phone 1 is circumnutated at 90 degrees in an arrow Y direction from the state of the cellular phone 1 illustrated in FIGS. 1A and 1B. The state of the cellular phone 1 illustrated in FIGS. 3A and 3B is referred to as "third state". It should be noted that FIG. 3A illustrates an external configuration of the cellular phone 1 set in the third state as viewed from the front, and FIG. 3B illustrates an external configuration of the cellular phone 1 set in the third state as viewed from the side.

Figure 4A:
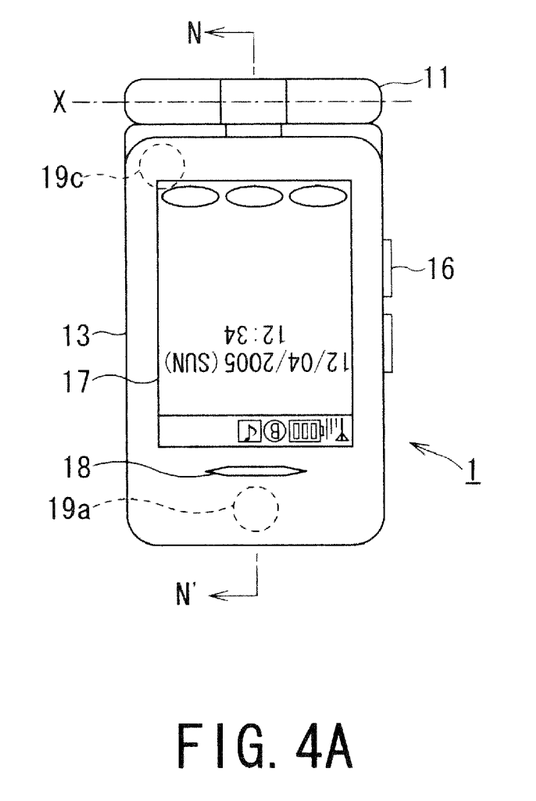
FIGS. 4A and 4B illustrate other external configurations of the cellular phone which can be applied to the information processing apparatus according to the embodiment of the present invention.
Figure 4B:
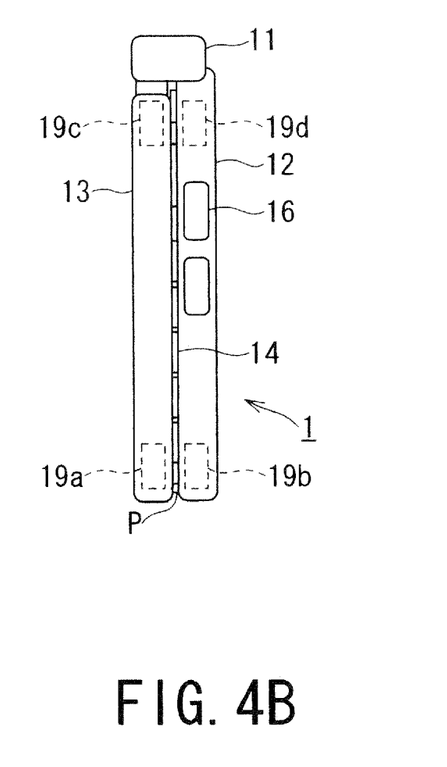

FIGS. 4A and 4B illustrate other external configurations of the cellular phone 1 which can be applied to the information processing apparatus according to the embodiment of the present invention. The state of the cellular phone 1 in FIGS. 4A and 4B is a state in which the cellular phone 1 is circumnutated at about 180 degrees in the arrow Y direction from the state of the cellular phone 1 in FIGS. 3A and 3B and then rotated in an arrow X direction so that the first, casing 12 and the second casing 13 are overlapped one another while the main display 17 faces outward. The state of the cellular phone 1 illustrated in FIGS. 4A and 4B (so-called turn over style) is referred to as "fourth state". It should be noted that FIG. 4A illustrates an external configuration of the cellular phone 1 set in the fourth state as viewed from the front, and FIG. 4B illustrates an external configuration of the cellular phone 1 set in the fourth state as viewed from the side. It should be noted that as illustrated in FIGS. 1A to 4B, the cellular phone 1 capable of rotating in two axes perpendicular to each other is referred to as "cellular phone capable of being biaxial pivotal".

Figures 5A, 5B, 5C, 5D:
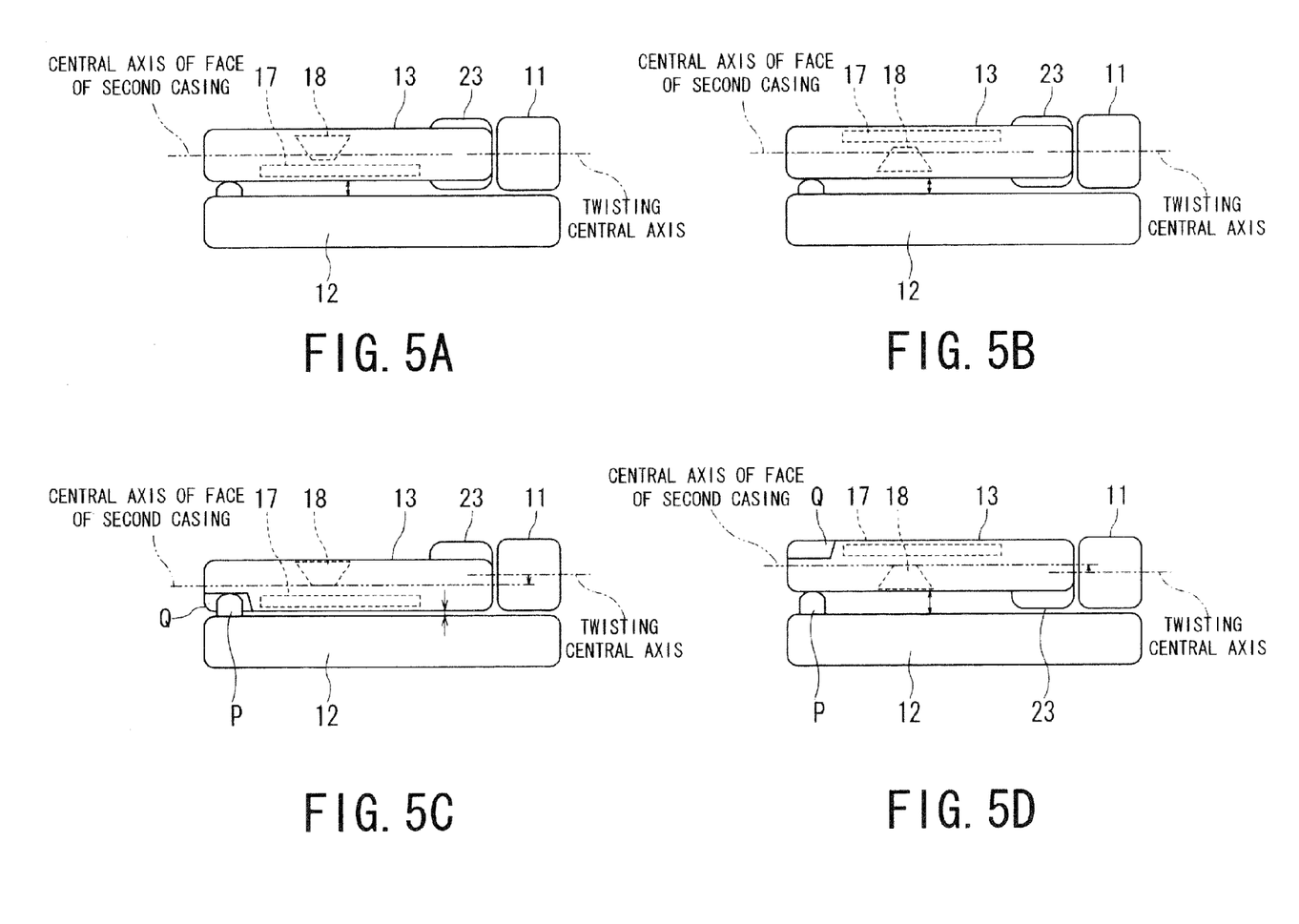
FIG. 5A is a schematic cross sectional view of a cellular phone in a related art as taken along an M-M' line of FIG. 2A.
FIG. 5B is a schematic cross sectional view of the cellular phone in the related art as taken along an N-N' line of FIG. 4A.
FIG. 5C is a schematic cross sectional view of the cellular phone according to the embodiment of the present invention as taken along the M-M' line of FIG. 2A.
FIG. 5D is a schematic cross sectional view of the cellular phone according to the embodiment of the present invention as taken along the N-N' line of FIG. 4A.

Incidentally, in the case of the cellular phone 1 capable of being biaxial pivotal, for example, as illustrated in FIGS. 5A and 5B, in order to downsize the casing of the cellular phone 1 in either state where the first casing and the second casing are closed (the second state illustrated in FIGS. 2A and 2B) so that the second casing 13 having the main display 17 is on top of the first casing 12 or where the second casing 13 is rotated at about 180 degrees about the twisting central axis (in the arrow Y direction in FIGS. 3A and 33) and thereafter the first casing 12 and the second casing 13 are closed (the fourth state illustrated in FIGS. 4A and 4B (so-called turn over style), the central axis on the face of the second casing 13 is coincided with the twisting central axis used for rotating the second casing 13.

It should be noted that FIG. 5A is a schematic cross sectional view of the cellular phone 1 in a related art as taken along the M-M' line of FIG. 2A, FIG. 5B is a schematic cross sectional view of the cellular phone 1 in the related art as taken along the N-N' line of FIG. 4A. Also, in the case of FIGS. 5A and 5B, in the second casing 13, an area near a hinge connection with the hinge unit 11 is configured as a wall thick part 23. This is for emphasizing a state in which the first casing 12 and the second casing 13 are hinge-connected via the hinge unit 11.

At this time, in either state (the second state or the fourth state) of the cellular phone 1 described above, in order to keep a clearance between the first casing 12 and the second casing 13 constant, it is necessary to manage fluctuations in thickness of the casings in advance. To be more specific, fluctuations in thickness of the casing are generated respectively on a main display side and on a back face side of the second casing in a manufacturing procedure of parts and at the time of assembly, so that the casings cannot be appropriately closed in some cases as the casing is swollen too much in the thickness direction in either state, in either state (the second state or the fourth state). For example, such a case is considerable that the second casing 13 becomes thicker to some extent in the manufacturing procedure and the second casing 13 contacts the first casing 12 so that the casings cannot be appropriately closed. In view of the above, it is necessary to manage fluctuations in thickness of the casings in advance, in either state (the second state or the fourth state), in order to keep the clearance between the first casing 12 and the second casing 13 constant, it is necessary to spare a slightly large clearance between the first casing 12 and the second casing 13.

However, if the wasteful clearance exists between the first casing 12 and the second casing 13, the casing size of the cellular phone 1 becomes large, and there is a limitation in downsizing the casing of the cellular phone 1.

In view of the above, in the state where the first casing 12 and the second casing 13 are closed so that the second casing 13 having the main display 17 is on top of the first casing 12 (the second state), the central axis on the face of the second casing 13 is shifted by a predetermined amount (for example, 0.15 mm to 0.20 mm, etc.) with respect to the twisting central axis used for rotating the second casing 13 in a direction the second casing 13 approaches the first casing 12. With this configuration, in the closed state indicated by the second state, the clearance between the first casing 12 and the second casing 13 is set narrower than the previous case by the predetermined amount. On the other hand, in the state where the second casing 13 is rotated about the twisting central axis (in the arrow Y direction in FIGS. 3A and 3B) at about 180 degrees and then the first casing 12 and the second casing 13 are closed (the fourth state), the positional relation between the first casing 12 and the second casing 13 is relatively shifted, and the clearance between the first casing 12 and the second casing 13 is set wider than the previous case by the predetermined amount. As a result, in the fourth state where the clearance between the casings is set wider by the predetermined amount, it is virtually possible to prevent such a situation that the casings cannot be appropriately closed as the casing is swollen in the thickness direction, for example. As to the fluctuations in thickness generated in the manufacturing procedure of parts and at the time of assembly, it suffices if a consideration is given on the back face side with respect to the main display side of the second casing, so that it is possible to realize a configuration which hardly receive an influence from the fluctuations in the casings of the cellular phone 1.

Of course, even if the central axis on the face of the second casing 13 is shifted in the fourth state with respect to the twisting central axis used for rotating the second casing 13 by a predetermined amount in the direction where the second casing 13 approaches the first casing 12, it is similarly possible to obtain a configuration which is hard to receive an influence from the fluctuations in the casings of the cellular phone 1. As described above, in the second state, by shifting the central axis on the face of the second casing 13 by a predetermined amount in the direction where the second casing 13 approaches the first casing 12, the following effects can also be obtained. That is, in a case where the second casing 13 is provided with the speaker 18, at the time of the second state, the speaker 18 faces outward, and at the time of the fourth state, the speaker 18 faces inward. In the fourth state, the positional relation between the first casing 12 and the second casing 13 are relatively shifted, the clearance between the first casing 12 and the second casing 13 is set to be wider than the previous case by the predetermined amount. Thus, as compared with the related art, such an environment is obtained that the audio output from the speaker 18 is facilitated, and it is possible to realize an acoustically advanced configuration for the speaker 18. Hereinafter, an embodiment of the present invention using this configuration will be described in detail.

FIG. 5C is a schematic cross sectional view of the cellular phone 1 using the configuration for the cellular phone 1 according to the embodiment of the present invention as taken along the M-M' line of FIG. 2A, and FIG. 5D is a schematic cross sectional view of the cellular phone 1 using the configuration for the cellular phone 1 according to the embodiment of the present invention as taken along the N-N' line of FIG. 4A.

As illustrated in FIG. 5C, in the case of the second state, the central axis on the face of the second casing 13 is shifted with respect to the twisting central axis used for rotating the second casing 13 in a direction where the second casing 13 approaches the first casing 12 by a predetermined amount (for example, 0.15 mm to 0.20 mm, etc.). With this configuration, as compared with the clearance between the first casing 12 and the second casing 13 in the related art (for example, 0.6 mm, etc.), it is possible to set the clearance between the first casing 12 and the second casing 13 to be narrower than the previous case by the predetermined amount shifted in the direction where the second casing 13 approaches the first casing 12 (for example, 0.15 mm to 0.20 mm, etc.). That is, when the clearance between the first casing 12 and the second casing 13 is 0.6 mm in the related art, by adopting the configuration according to the embodiment of the present invention, the clearance can be set as 0.40 mm to 0.45 mm. It should be noted that in this case, as the second casing 13 is provided with the retreating recessed unit Q at a position corresponding to the clearance keeper P provided to the first casing 12, it is possible to shift the central axis on the face of the second casing 13 with respect to the twisting central axis used for rotating the second casing 13 in the direction where the second casing 13 approaches the first casing 12 by the predetermined amount. At this time, in the second state, by way of fitting between the clearance keeper P provided to the first casing 12 and the retreating recessed, unit Q provided to the second casing 13, an impact caused at the time of contact between the first casing 12 and the second casing 13 is relaxed, and the extent of the second casing 13 in the thickness direction is suppressed, so that at the time of the closed state indicated by the second state, the casing of the cellular phone 1 can be more downsized. Of course, the casing provided with the clearance keeper P and the casing provided with the retreating recessed unit Q are substituted by each other, a recessed and raised relation may be set inverse while the second casing 13 is provided with the clearance keeper P and the first casing 12 is provided with the retreating recessed unit Q.

On the other hand, in the case of the fourth state, through the twist of the second casing 13, the positional relation between the first casing 12 and the second casing 13 is relatively shifted. As compared with the clearance between the first casing 12 and the second casing 13 in the related art (for example, 0.6 mm, etc.), it is possible to set the clearance between the first casing 12 and the second casing 13 wider than the previous case by a predetermined amount shifted in the direction where the second casing 13 approaches the first casing 12 (for example, 0.15 mm to 0, 20 mm, etc.). That is, when the clearance between the first casing 12 and the second casing 13 is 0.6 mm in the related art, by adopting the configuration according to the embodiment of the present invention, the clearance can be set as 0.75 mm to 0.80 mm. At this time, in the second state, the clearance keeper P provided to the first casing 12 contacts a predetermined position on the back face side with respect to the main display side of the second casing 13.

It should be noted that the predetermined amount by which the central axis on the face of the second casing 13 is shifted may be appropriately changed.

With this configuration, in the fourth state where the clearance between the casings is wider by the predetermined amount, it is virtually possible to prevent such a situation that the casings cannot be appropriately closed as the casing is swollen in the thickness direction, for example. As to the fluctuations in thickness generated in the manufacturing procedure of parts and at the time of assembly, it suffices if a consideration is given on the back face side with respect to the main display side of the second casing, it is possible to realize a configuration which hardly receive an influence from the fluctuations in the casings of the cellular phone 1. Then, in the second state, the casing size of the cellular phone 1 can be more downsized, and in a state where the user normally uses the cellular phone 1, the casing size of the cellular phone 1 can be set more compact. As a result, the ease of use of the cellular phone 1 is improved for the user.

On the other hand, in the fourth state, as compared with the related art, such an environment is obtained that the audio output from the speaker 18 is facilitated, and it is possible to realize an acoustically advanced configuration for the speaker 18. As a result, when the user listen to desired music from the cellular phone 1 by using, for example, a music player function, it is possible for the user to listen to the music with, an improved audio quality.

As described above, in accordance with the state of the cellular phone of the biaxial rotation system, it is possible to appropriately set the casing size of the cellular phone compact, and the usability of the cellular phone 1 can be improved.

It should be noted that in addition to the cellular phone 1, the present invention can be applied to other information processing apparatuses such as a PDA (Personal Digital Assistant), a personal computer, a portable game player, a portable music player, and a portable video player.

What is claimed is:

1. An information processing apparatus, comprising:
   an opening/closing mechanism in which a first casing and a second casing are hinge-connected via a hinge unit and the first casing and the second casing are opened and closed via the hinge unit; and
   a rotation mechanism in which the second casing is rotated about a twisting central axis which protrudes and contacts the hinge unit to rotatably support the second casing,
   wherein in a closed state where one face of the first casing and one face of the second casing are overlapped one another, a clearance between the first casing and the second casing is set to have a first distance, and in another closed state where the one face of the first casing and the other face of the second casing are overlapped one another by rotating the second casing about the twisting central axis, the clearance between the first casing and the second casing is set to have a second distance different from the first distance;
   wherein in the closed state where the one face of the first casing and the one face of the second casing are overlapped one another, when the clearance between the first casing and the second casing is set to have the first distance, a central axis of the face of the second casing is shifted by the first distance with respect to the twisting central axis in a direction where the second casing approaches the first casing.

2. The information processing apparatus according to claim 1, wherein the first distance is smaller than the second distance.

3. The information processing apparatus according to claim 1, wherein in said another closed state where the one face of the first casing and the other face of the second casing are overlapped one another, when the clearance between the first casing and the second casing is set to have the second distance, a central axis of the face of the second casing is shifted by the second distance with respect to the twisting central axis in a direction where the second casing departs from the first casing.

4. The information processing apparatus according to claim 1, wherein the second casing is provided with a speaker, in the closed state where the one face of the first casing and the one face of the second casing are overlapped one another, an audio outputting direction of the speaker is opposite to a direction of the first casing side, and in said another closed state where the one face of the first casing and the other face of the second casing are overlapped one another, the audio outputting direction of the speaker is the direction of the first casing side.

5. The information processing apparatus according to claim 1, wherein:
the first casing is provided with a contact member for keeping the clearance between the first casing and the second casing in one of the closed states where the one or the other face of the first casing and the one or the other face of the second casing are overlapped one another; and
the second casing is provided with a recessed part which faces and contacts the contact member in one of the closed states where the one or the other face of the first casing and the one or the other face of the second casing are overlapped one another.

* * * * *

UNITED STATES PATENT AND TRADEMARK OFFICE
CERTIFICATE OF CORRECTION

| | | |
|---|---|---|
| PATENT NO. | : 8,099,143 B2 | Page 1 of 1 |
| APPLICATION NO. | : 12/186799 | |
| DATED | : January 17, 2012 | |
| INVENTOR(S) | : Noma | |

It is certified that error appears in the above-identified patent and that said Letters Patent is hereby corrected as shown below:

On the Title Page, below Field (73), under "Notice", in Column 1, below Line 3, insert -- This patent is subject to a terminal disclaimer. --.

On the Title Page, in Field (45), under "Date of Patent", in Column 2, Line 1, delete "Jan. 17, 2012" and insert -- *Jan. 17, 2012 --, therefor.

Signed and Sealed this
Tenth Day of July, 2012

David J. Kappos
*Director of the United States Patent and Trademark Office*